(12) United States Patent
Mattes et al.

(10) Patent No.: US 9,054,980 B2
(45) Date of Patent: Jun. 9, 2015

(54) SYSTEM AND METHOD FOR LOCAL PACKET TRANSPORT SERVICES WITHIN DISTRIBUTED ROUTERS

(71) Applicant: Cisco Technology, Inc., San Jose, CA (US)

(72) Inventors: Paul Mattes, Minneapolis, MN (US); Lester Bird, Tracy, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 14/229,429

(22) Filed: Mar. 28, 2014

(65) Prior Publication Data

US 2014/0211628 A1 Jul. 31, 2014

Related U.S. Application Data

(60) Division of application No. 12/893,988, filed on Sep. 29, 2010, now Pat. No. 8,687,632, which is a continuation of application No. 12/110,962, filed on Apr. 28, 2008, now Pat. No. 7,843,930, which is a division of application No. 10/293,180, filed on Nov. 12, 2002, now Pat. No. 7,424,014.

(51) Int. Cl.
| | |
|---|---|
| *H04L 12/801* | (2013.01) |
| *H04L 12/701* | (2013.01) |
| *H04L 12/741* | (2013.01) |
| *H04L 12/775* | (2013.01) |
| *H04L 12/773* | (2013.01) |

(52) U.S. Cl.
CPC ............... *H04L 47/12* (2013.01); *H04L 45/00* (2013.01); *H04L 45/54* (2013.01); *H04L 45/583* (2013.01); *H04L 45/60* (2013.01)

(58) Field of Classification Search
CPC ....... H04L 12/801; H04L 47/12; H04L 45/00; H04L 45/54; H04L 45/583
USPC .................... 370/235, 395.32, 389, 392, 401
See application file for complete search history.

(56) References Cited

U.S. PATENT DOCUMENTS

| | | | |
|---|---|---|---|
| 5,079,738 | A | 1/1992 | Bockenfeld |
| 5,418,781 | A | 5/1995 | Kaufman et al. |
| 5,917,820 | A | 6/1999 | Rekhter |
| 6,269,099 | B1 | 7/2001 | Borella et al. |
| 6,339,595 | B1 | 1/2002 | Rekhter et al. |
| 6,424,621 | B1 | 7/2002 | Ramaswamy et al. |
| 6,463,061 | B1 | 10/2002 | Rekhter et al. |
| 6,553,423 | B1 | 4/2003 | Chen |
| 7,046,668 | B2 | 5/2006 | Pettey et al. |
| 7,130,305 | B2 | 10/2006 | Kuukankorpi et al. |
| 7,173,912 | B2 | 2/2007 | Jaber et al. |
| 7,382,782 | B1 | 6/2008 | Ferguson et al. |

(Continued)

OTHER PUBLICATIONS

U.S. Appl. No. 10/293,180, Examiner Interview Summary mailed Nov. 2, 2007, 2 pgs.

(Continued)

*Primary Examiner* — Jamal Javaid

(57) ABSTRACT

A system and method for routing packets within a router having a plurality of loosely-coupled route processors, including a first route processor, and a line card operably coupled to the plurality of distributed-route-processors. Each route processor includes an internal forwarding information base (IFIB). Each IFIB includes information that is used to route packets addressed to elements within the router.

11 Claims, 7 Drawing Sheets

(56) References Cited

U.S. PATENT DOCUMENTS

| | | | |
|---|---|---|---|
| 7,397,762 | B1 | 7/2008 | Firoiu et al. |
| 7,424,014 | B2 | 9/2008 | Mattes et al. |
| 7,843,930 | B2 | 11/2010 | Mattes et al. |
| 8,687,632 | B2 | 4/2014 | Mattes et al. |
| 2002/0021675 | A1 | 2/2002 | Feldmann |
| 2002/0126671 | A1 | 9/2002 | Ellis et al. |
| 2002/0141429 | A1 | 10/2002 | Pegrum et al. |
| 2003/0063611 | A1 | 4/2003 | Schaub et al. |
| 2003/0174653 | A1 | 9/2003 | Basu et al. |
| 2005/0074001 | A1 | 4/2005 | Mattes et al. |
| 2005/0190694 | A1 | 9/2005 | Ben-Nun et al. |
| 2008/0198854 | A1 | 8/2008 | Mattes et al. |
| 2011/0019670 | A1 | 1/2011 | Mattes et al. |

OTHER PUBLICATIONS

U.S. Appl. No. 10/293,180, Final Office Action mailed Sep. 13, 2007, 10 pgs.

U.S. Appl. No. 10/293,180, Non Final Office Action mailed Feb. 1, 2007, 8 pgs.

U.S. Appl. No. 10/293,180, Notice of Allowance mailed Dec. 27, 2007, 8 pgs.

U.S. Appl. No. 10/293,180, Response filed Jan. 8, 2007 to Restriction RequirementDec. 6, 2006, 14 pgs.

U.S. Appl. No. 10/293,180, Response filed Jul. 2, 2007 to Non Final Office Action mailed Feb. 1, 2007, 18 pgs.

U.S. Appl. No. 10/293,180, Restriction Requirement mailed Dec. 6, 2006, 5 pgs.

U.S. Appl. No. 12/110,962, Final Office Action mailed May 4, 2010, 9 pgs.

U.S. Appl. No. 12/110,962, Non-Final Office Action mailed Dec. 9, 2009, 9 pgs.

U.S. Appl. No. 12/110,962, Notice of Allowance mailed Jul. 26, 2010, 4 pgs.

U.S. Appl. No. 12/110,962, Preliminary Amendment filed Mar. 24, 2009, 8 pgs.

U.S. Appl. No. 12/110,962, Response filed Mar. 9, 2010 to Non Final Office Action mailed Dec. 9, 2009, 10 pgs.

U.S. Appl. No. 12/110,962, Response filed Jul. 6, 2010 to Final Office Action mailed May 4, 2010, 9 pgs.

U.S. Appl. No. 12/893,988 , Response filed Mar. 11, 2013 to Final Office Action mailed Jan. 9, 2013, 10 pgs.

U.S. Appl. No. 12/893,988 , Response filed Dec. 19, 2012 to Non Final Office Action mailed Sep. 19, 2012, 10 pgs.

U.S. Appl. No. 12/893,988, Examiner Interview Summary mailed Feb. 5, 2013, 3 pgs.

U.S. Appl. No. 12/893,988, Examiner Interview Summary mailed Aug. 26, 2013, 3 pgs.

U.S. Appl. No. 12/893,988, Examiner Interview Summary mailed Dec. 18, 2012, 4 pgs.

U.S. Appl. No. 12/893,988, Final Office Action mailed Jan. 9, 2013, 10 pgs.

U.S. Appl. No. 12/893,988, Final Office Action mailed Jul. 18, 2013, 14 pgs.

U.S. Appl. No. 12/893,988, Non Final Office Action mailed Mar. 26, 2013, 12 pgs.

U.S. Appl. No. 12/893,988, Non Final Office Action mailed Sep. 19, 2012, 9 pgs.

U.S. Appl. No. 12/893,988, Notice of Allowance mailed Nov. 13, 2013, 10 pgs.

U.S. Appl. No. 12/893,988, Response filed Jun. 25, 2013 to Non Final Office Action mailed Mar. 25, 2013, 10 pgs.

U.S. Appl. No. 12/893,988, Response filed Oct. 18, 2013 to Final Office Action mailed Jul. 18, 2013, 10 pgs.

"Configuring BGP", http://www.cisco.com/un_d/cc/t...s120/12cgcr/npl_c/1cprt1/1cbgp.htm, (1989-1999), 1-44.

International Application No. PCT/US2004/032144, Notification of Transmittal of the International Search Report and the Written Opinion mailed Nov. 1, 2005, 2 pgs.

International Application No. PCT/US2004/032144, Search Report mailed Nov. 1, 2005, 4 pgs.

Bates, Tony, et al., "Multiprotocol Extensions for BGP-4", http://www.search.ietf.org/internet-drafts/draft-ietf-idr-bgp4-multiprotocol-v2-02.txt, (Posted Apr. 2, 1999), 1-10.

Chandra, R., et al. "Capabilities Negotiation with BGP-4", http://www.ietf.org/intenet-drafts/draft-ietf-idr-bgp4-cap-neg-03.txt, (Posted Mar. 10, 1999), 1-4.

Pearlman, R, "Interconnections, Bridges and Routers", Addison Wesley Publishing Comany, Reading Massachusetts, (1992), 323-329.

Rekhter, et al., "A Border Gateway Protocol 4 (BGP-4)", Internet Engineering Task Force, (Apr. 2003), 1-84.

Rekhter, et al., "A Border Gateway Protocol 4 (BGP-4) Request for Comments RFC) 1771, Internet Engineering Task Force", Internet Engineering Task Force, http://www.ief.org, (Mar. 1995), 1-57.

SYSTEM AND METHOD FOR LOCAL PACKET TRANSPORT SERVICES WITHIN DISTRIBUTED ROUTERS

CLAIM OF PRIORITY

This application is a divisional of prior U.S. patent application Ser. No. 12/893,988, entitled "SYSTEM AND METHOD FOR LOCAL PACKET TRANSPORT SERVICES WITHIN DISTRIBUTED ROUTERS," and filed Sep. 29, 2010, now U.S. Pat. No. 8,687,632, issued on Apr. 1, 2014, which is a continuation of prior U.S. patent application Ser. No. 12/110,962, entitled "SYSTEM AND METHOD FOR LOCAL PACKET TRANSPORT SERVICES WITHIN DISTRIBUTED ROUTERS," and filed Apr. 28, 2008, now U.S. Pat. No. 7,843,930, issued on Nov. 30, 2010, which is a divisional of U.S. patent application Ser. No. 10/293,180, entitled "SYSTEM AND METHOD FOR LOCAL PACKET TRANSPORT SERVICES WITHIN DISTRIBUTED ROUTERS," and filed Nov. 12, 2002, now U.S. Pat. No. 7,424,014, issued on Sep. 9, 2008, all of which are incorporated by reference herein in their entirety.

FIELD OF THE INVENTION

This invention relates generally to network routers, and more particularly to local packet transport services for network routers having distributed route processors.

BACKGROUND OF THE INVENTION

A router is a device that forwards traffic between networks. Routers use headers and a forwarding table to determine where packets go, and they use messaging such as the Border Gateway Protocol (BGP) to communicate with each other and configure the best route between any two hosts.

Conventional routers include a packet forwarding component and a route processor (RP). The RP determines and controls configuration, security, accounting, debugging, and network management processes of the packet-forwarding component. Examples of route processors include the Cisco® CSC/3 and the CSC/4 route processors. Route processors are typically implemented on an electronic printed circuit board.

The RP typically has relatively more processing and resource requirements than the packet-forwarding component. As the traffic between networks increases, router capacity must also increase. This places an even greater processing demand on the RP. The RP can, therefore, become a "bottleneck" as processing in the router is slowed by inadequate processing capability within the RP.

One solution for meeting the increased processing demands on the RP is to distribute the RP function across two or more loosely coupled processors. A problem with this approach is how to direct locally addressed packets to the appropriate RP out of the two or more distributed route processors. Another problem is how to reassemble fragments in an RP distributed across two or more processors.

For the reasons stated above, and for other reasons stated below which will become apparent to those skilled in the art upon reading and understanding the present specification, there is a need in the art for a system and method for routing packets within routers having distributed route processors.

SUMMARY OF THE INVENTION

The above-mentioned shortcomings, disadvantages and problems are addressed by the present invention, which will be understood by reading and studying the following specification.

According to one aspect of the present invention, a router includes a plurality of loosely coupled route processors, including a first route processor, and a line card operably coupled to the plurality of distributed-route-processors. Each route processor includes an internal forwarding information base (IFIB), wherein each IFIB includes information used to route packets addressed to the router.

According to another aspect of the present invention, a router includes a plurality of route processors, including a first route processor, and a line card operably coupled to the plurality of distributed-route-processors. Each route processor includes an internal forwarding information base (IFIB), wherein the IFIB is used to direct inbound packets to a particular set of router elements within the router, and one of the plurality of distributed-route-processors includes a port arbitrator, wherein the port arbitrator assembles the IFIB and distributes it to the route processors.

According to another aspect of the present invention, a method for managing a router includes receiving a locally addressed packet and determining if the packet lacks a defined flow. If the packet lacks a defined flow, the method assigns a session to one of a plurality of route processors as a function of a router policy and forwards the packet to the assigned route processor.

According to another aspect of the present invention, a method for managing a router having a plurality of elements, including a route processor and a line card, includes generating an internal forwarding information base (IFIB), wherein the IFIB maps one or more flows to elements within the router, and distributing the internal forwarding information base to at least one element in the router.

According to another aspect of the present invention, a method for handling a packet fragment in a router having a plurality of route processors includes receiving a plurality of packets, detecting packet fragments from among the packets, routing the packet fragments to a route processor as a function of a packet fragment routing policy, assembling the packet fragments into a reassembled packet, and routing the reassembled packet to a route processor as a function of an internal forwarding information base (IFIB).

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of embodiments of the invention, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention. The following detailed description is, therefore, not to be taken in a limiting sense, and the scope of the present invention is defined only by the appended claims.

As noted above, routers use headers and a forwarding table to determine where packets should be routed. A router typically includes a forwarding information source that maps header information in incoming network packets to the addresses of other routers in the network space. The forwarding information source is distributed to individual components in the router on an as-needed basis (or may be updated synchronously) to be used in forwarding incoming packets.

A router must be able to handle locally addressed packets. A locally addressed packet is a packet that is addressed to the router, having the router as the final destination. It may also be addressed to a specific sub-component or element of the router. As noted above, the process of forwarding a locally addressed packet to a route processor is particularly difficult in routers having two or more route processors.

This detailed description is divided into five sections. In the first section, a system level overview of one embodiment of the invention is presented. In the second section, more detailed embodiments of the invention are described. In the third section, methods for an embodiment of the invention are provided. In the fourth section, the hardware and the operating environment in conjunction with which embodiments of the invention may be practiced are described. Finally, in the fifth section, a conclusion of the detailed description is provided.

System Level Overview

Figure 1:
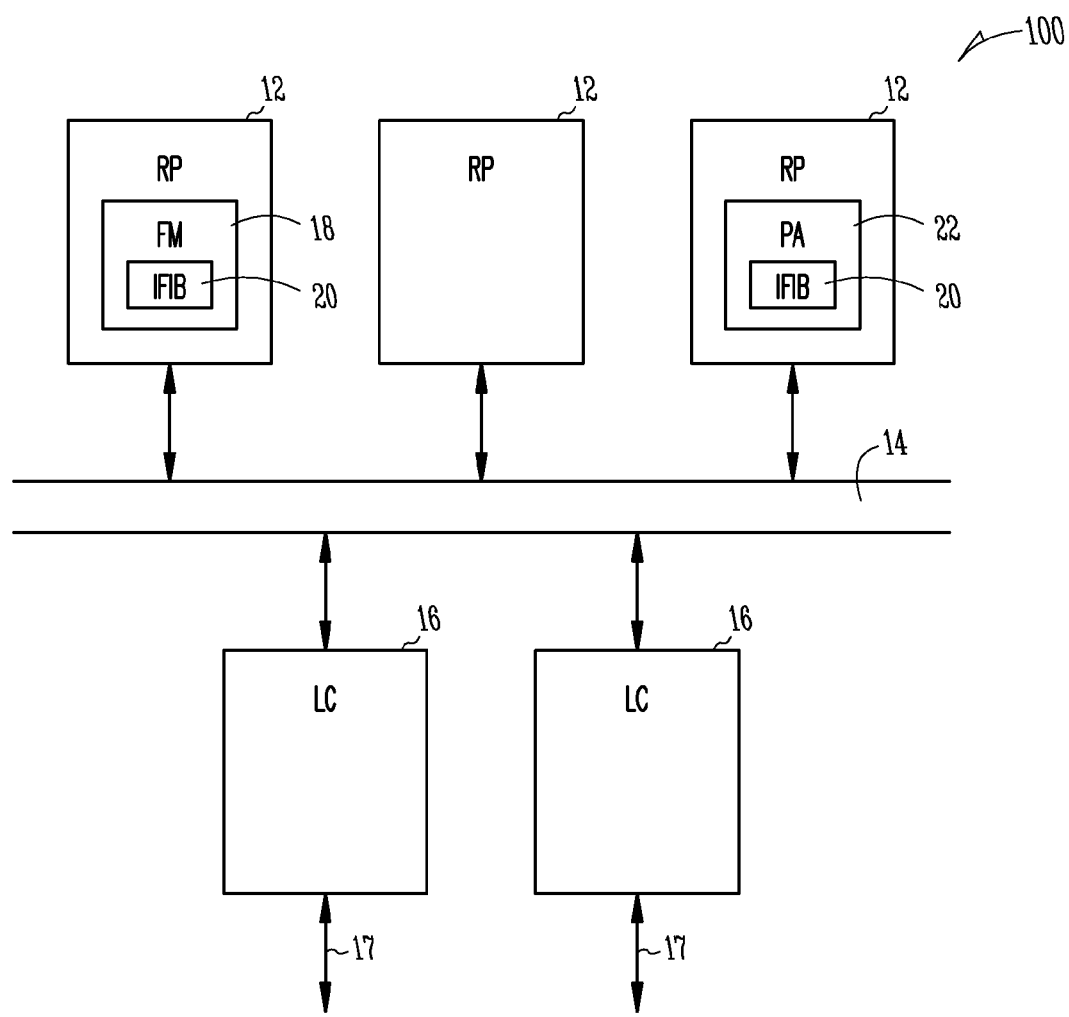
FIG. 1 is a block diagram illustrating a system-level overview of an embodiment of the invention.

FIG. 1 is a block diagram that provides a system level overview of the operation of one embodiment of the present invention. Router 100 includes route processors (route processors) 12 connected across a network 14 to one or more line cards 16. Line cards 16 receive packets from line interface 17. In one embodiment, one of the route processors 12 includes a flow manager 18. Flow manager 18 includes an internal forwarding information base (IFIB) 20. In the embodiment shown in FIG. 1, a port arbitrator (PA) 22 assembles the IFIB 20 based on a router policy and distributes it to flow manager 18.

In one embodiment, port arbitrator 22 includes software for monitoring flow manager 18 and for starting a new flow manager 18 on a second route processor 12 if it detects that the original flow manager has failed.

Flow manager 18 and port arbitrator 22 can also be implemented in processors other than route processors 12 either within or outside of router 100.

Figure 2:
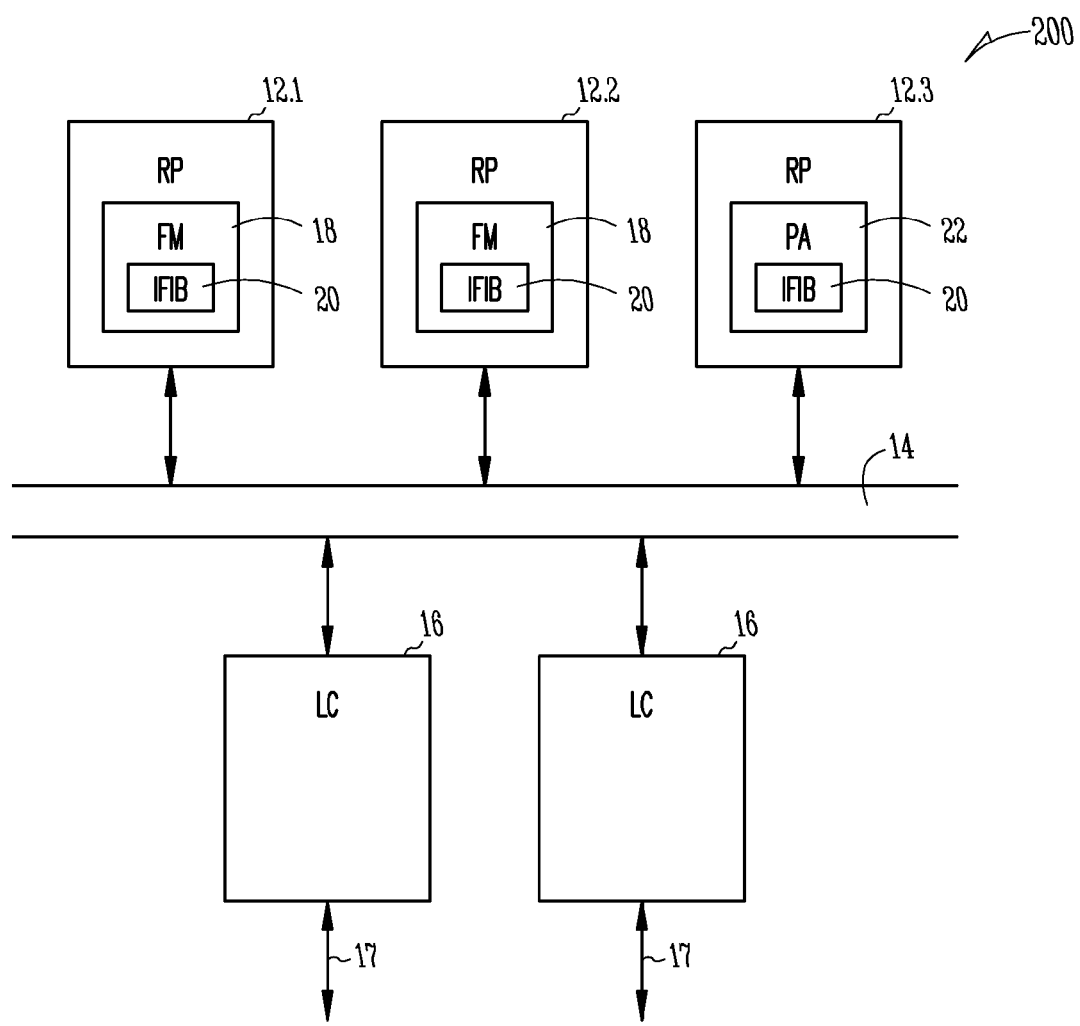
FIGS. 2-6 are block diagrams illustrating alternate embodiments of the invention.

FIG. 2 is a block diagram that provides a system level overview of the operation of another embodiment of the present invention. Router 200 includes route processors (route processors) 12 connected across a network 14 to one or more line cards 16. Line cards 16 receive packets from line interface 17. In the embodiment shown, two of the route processors 12.1 and 12.2 include flow managers 18. As in system 100 of FIG. 1, each flow manager 18 includes an internal forwarding information base (IFIB) 20 used to route internally addressed packets. In contrast to router 100, however, in router 200 processing of packet flows is distributed across the flow managers 18, allowing system 200 to scale to handle the resource demands imposed by increasing numbers of incoming network packets.

In the embodiment shown in FIG. 2, a port arbitrator (PA) 22 executing in route processor 12.3 assembles the IFIB 20 based on a router policy and distributes all or part of it to each of the flow managers 18. In one such embodiment, the router policy includes consideration for load balancing between flow managers 18.

As in router 100 of FIG. 1, flow manager 18 and port arbitrator 22 can also be implemented in processors other than route processors 12 either within or outside of router 200.

Figure 3:
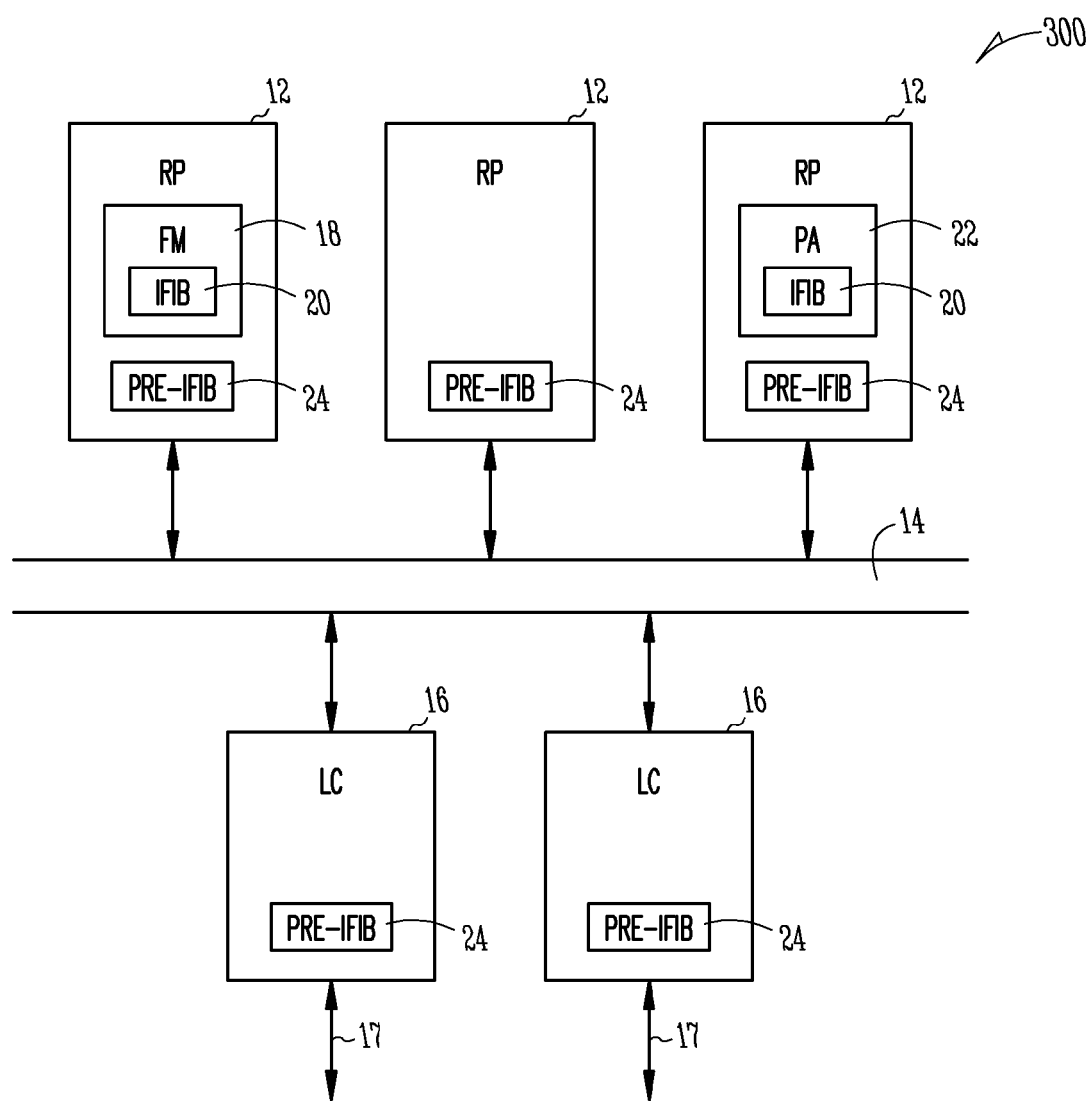

FIG. 3 is a block diagram that provides a system level overview of the operation of one embodiment of the present invention. Router 300 includes route processors (route processors) 12 connected across a network 14 to one or more line cards 16. Line cards 16 receive packets from line interface 17. In one embodiment, one of the route processors 12 includes a flow manager 18. Flow manager 18 includes an internal forwarding information base (IFIB) 20. In the embodiment shown in FIG. 3, a port arbitrator (PA) 22 assembles the IFIB 20 based on a router policy and distributes it to flow manager 18.

In the embodiment shown in FIG. 3, line cards 16 and route processors 12 include a pre-IFIB 24, a table of forwarding information used to route internally addressed packets. In one embodiment, the pre-IFIB is a subset of the IFIB used by flow manager 18. Pre-IFIB 24 is used to expedite forwarding of pre-established flows through each line card 16 and route processor 12. In one such embodiment, port arbitrator 22 distributes pre-IFIB 24 when port arbitrator 22 updates the IFIB in flow manager 18. In another embodiment, the contents of pre-IFIB 24 are updated by flow manager 18 on an as-needed basis.

In one embodiment, port arbitrator 22 includes software for monitoring flow manager 18 and for starting a new flow manager 18 on a second route processor 12 if it detects that the original flow manager has failed.

As in routers 100 and 200 of FIGS. 1 and 2, flow manager 18 and port arbitrator 22 can also be implemented in processors other than route processors 12 either within or outside of router 300.

Figure 4:
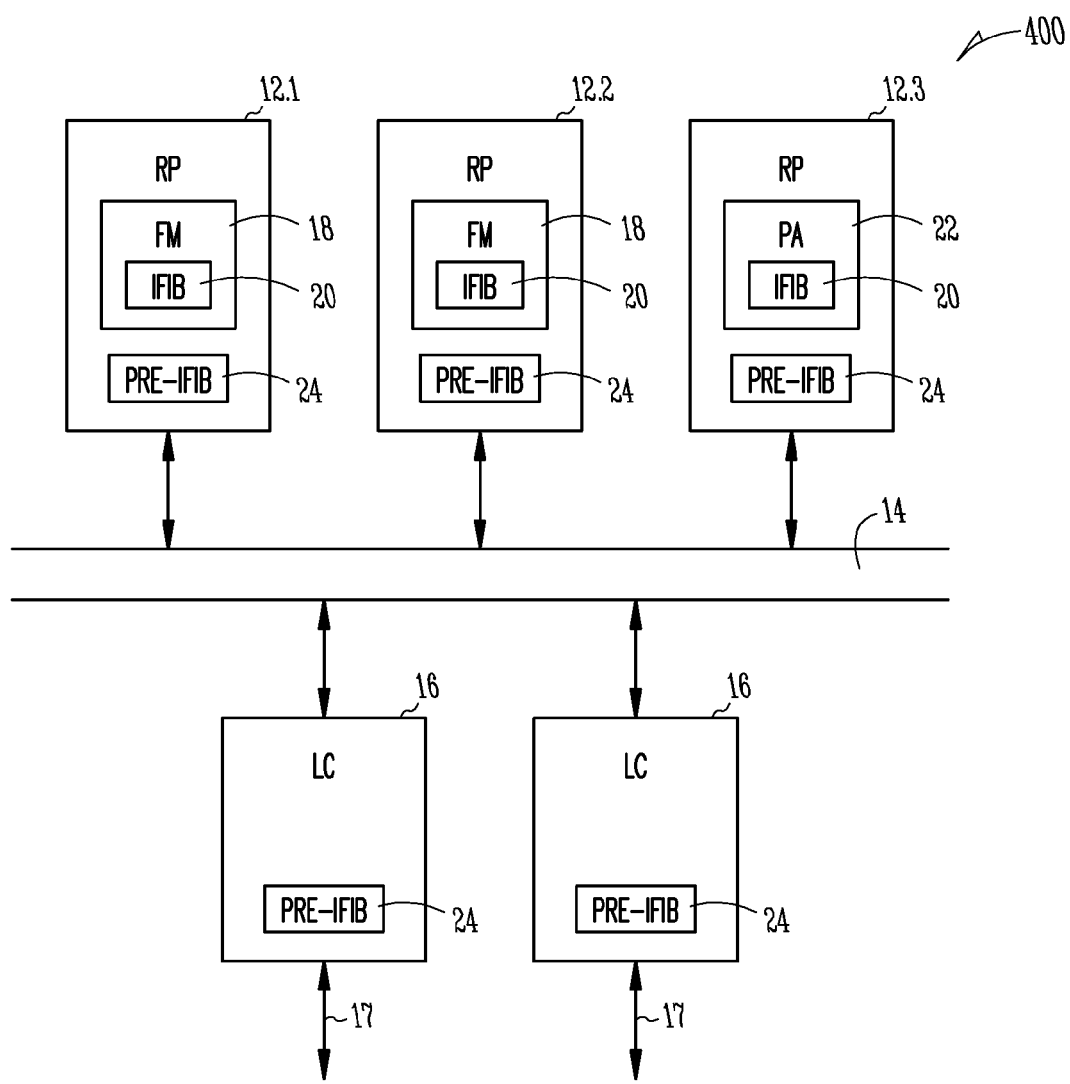

FIG. 4 is a block diagram that provides a system level overview of the operation of another embodiment of the present invention. Router 400 includes route processors (route processors) 12 connected across a network 14 to one or more line cards 16. Line cards 16 receive packets from line interface 17. In the embodiment shown, two of the route processors 12.1 and 12.2 include flow managers 18. As in system 200 of FIG. 2, each flow manager 18 includes an internal forwarding information base (IFIB) 20 used to route internally addressed packets. As in router 200, processing of packet flows is distributed across the multiple flow managers 18, allowing system 400 to scale to handle the resource demands imposed by increasing numbers of incoming network packets.

In the embodiment shown in FIG. 4, a port arbitrator (PA) 22 executing in route processor 12.3 assembles the IFIB 20 based on a router policy and distributes it to each of the flow managers 18. In one such embodiment, the router policy includes consideration for load balancing between flow managers 18.

In the embodiment shown in FIG. 4, line cards 16 and route processors 12 include a pre-IFIB 24, a table of forwarding information used to route internally addressed packets. In one embodiment, the pre-IFIB is a subset of the IFIB used by flow manager 18. In one such embodiment, pre-IFIB 24 is distributed by port arbitrator 22 when PA 22 updates the IFIB in flow manager 18. In another embodiment, the contents of pre-IFIB 24 are written by flow manager 18 on an as-needed basis. Other embodiments are contemplated where the pre-IFIB is used on only a subset of line cards 16, or route processors 12, or on a combination of line cards 16 and route processors 12.

As in routers 100, 200 and 300 of FIGS. 1-3, flow manager 18 and port arbitrator 22 can also be implemented in processors other than route processors 12 either within or outside of router 400.

In one embodiment, port arbitrator 22 includes software for monitoring flow managers 18 and for starting a new flow manager 18 if it detects that one of the original flow managers 18 has failed.

In each of the examples above, line card 16 receives a network packet via line interface 17 and determines the RP 12 in the router to forward the packet to using IFIB 260. In the embodiments shown in FIGS. 1 and 2, the packet is automatically routed to one of the flow managers 18. In the embodiments shown in FIGS. 3 and 4, the line card consults the pre-IFIB to determine if it knows the destination of the internally addressed packet already. If so, the packet is forwarded to the appropriate element in the router. If not, the packet is routed to one of the flow managers 18.

The identical IFIBs in the router introduce an economy of scale in generating the IFIBS. The IFIBs are generated before the arrival of a packet, thus reducing the amount to time needed to determine where a packet should be forwarded.

In one embodiment, the route-processing throughput of the route processors 12 is balanced against the input and output capability of the one of more line cards 16. In one such embodiment, the number of route processors 12 is chosen to substantially match or equal the input and output capability of the one of more line cards 16.

More detailed embodiments of routers according to the present invention will be discussed next. In the following description, a route processor is an independent processing element with independent memory. An element is a line card, route processor, or other independently addressable device within the router. A logical router is an independently administered partition of the router.

A flow is a binding between a <protocol, remote address, remote port, local address, local port> tuple and an element.

An Internal Forwarding Information Base (IFIB) is that portion of the Forwarding Information Base (FIB) used to direct incoming packets to the proper element(s) within the router.

Local Packet Transport Services (LPTS) is the name of the service used to distribute locally addressed packets.

RST is the TCP/IP ReSeT packet. It is used to reject a TCP connection.

Figure 5:
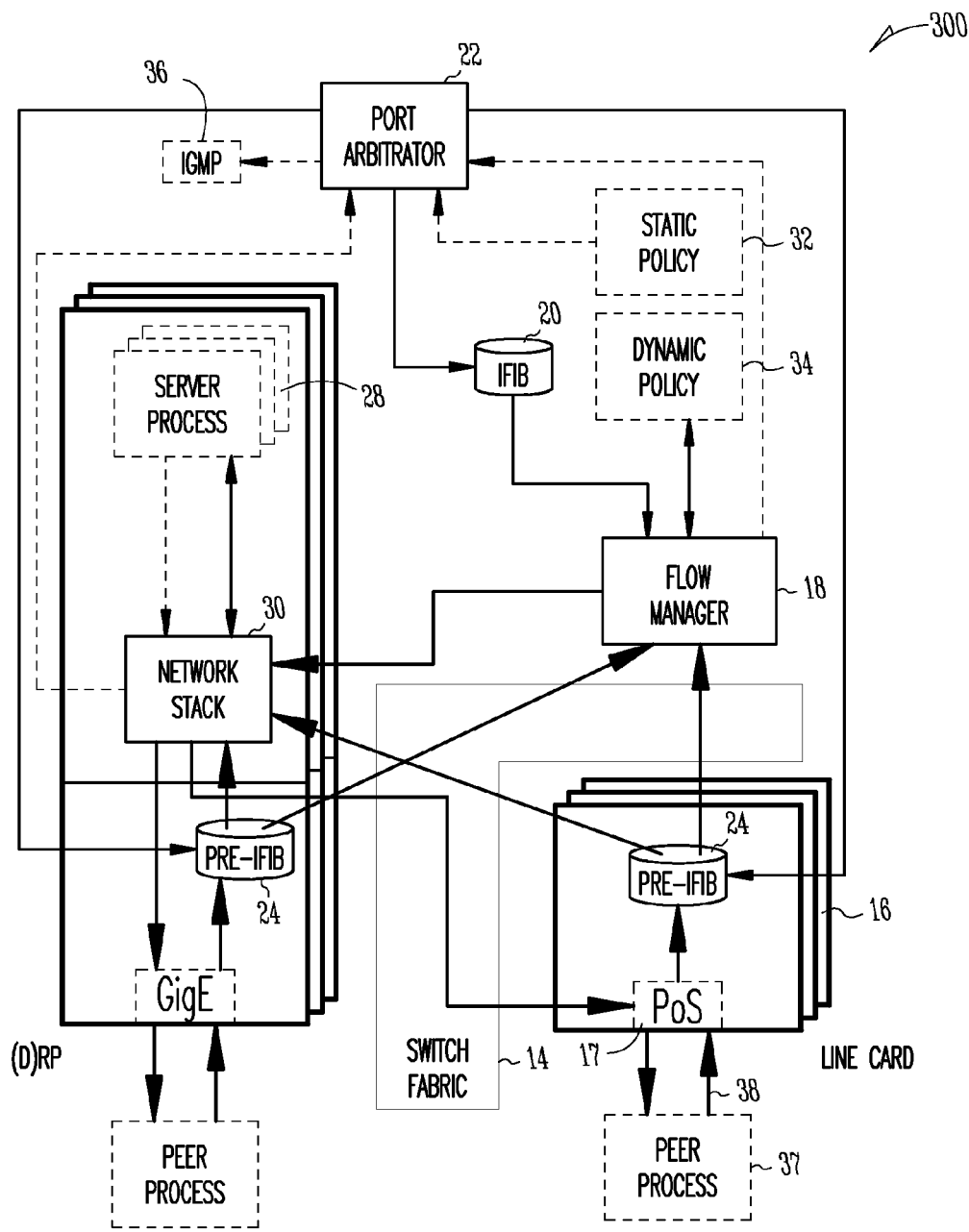
Figure 5:
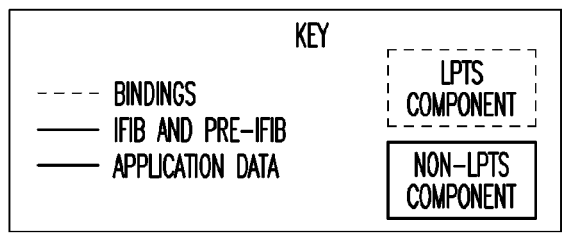

FIG. 5 is a block diagram of one embodiment of router 300 of FIG. 3. In the embodiment shown in FIG. 5, a flow manager 18 executes on one RP 12 while port arbitrator 22 runs on another RP 12. (In another embodiment, both flow manager 18 and port arbitrator 22 execute within one RP 12.)

In the embodiment shown in FIG. 5, each line card 16 is connected through network 14 to route processors 12. In the example shown network 14 is a switch fabric. Other networks are contemplated within the scope of the present invention.

Each line card 16 includes a line interface 17 and a pre-IFIB 24. In one embodiment, each line interface 17 is connected to one or more peer processes 37 over a network 38.

Figure 6:
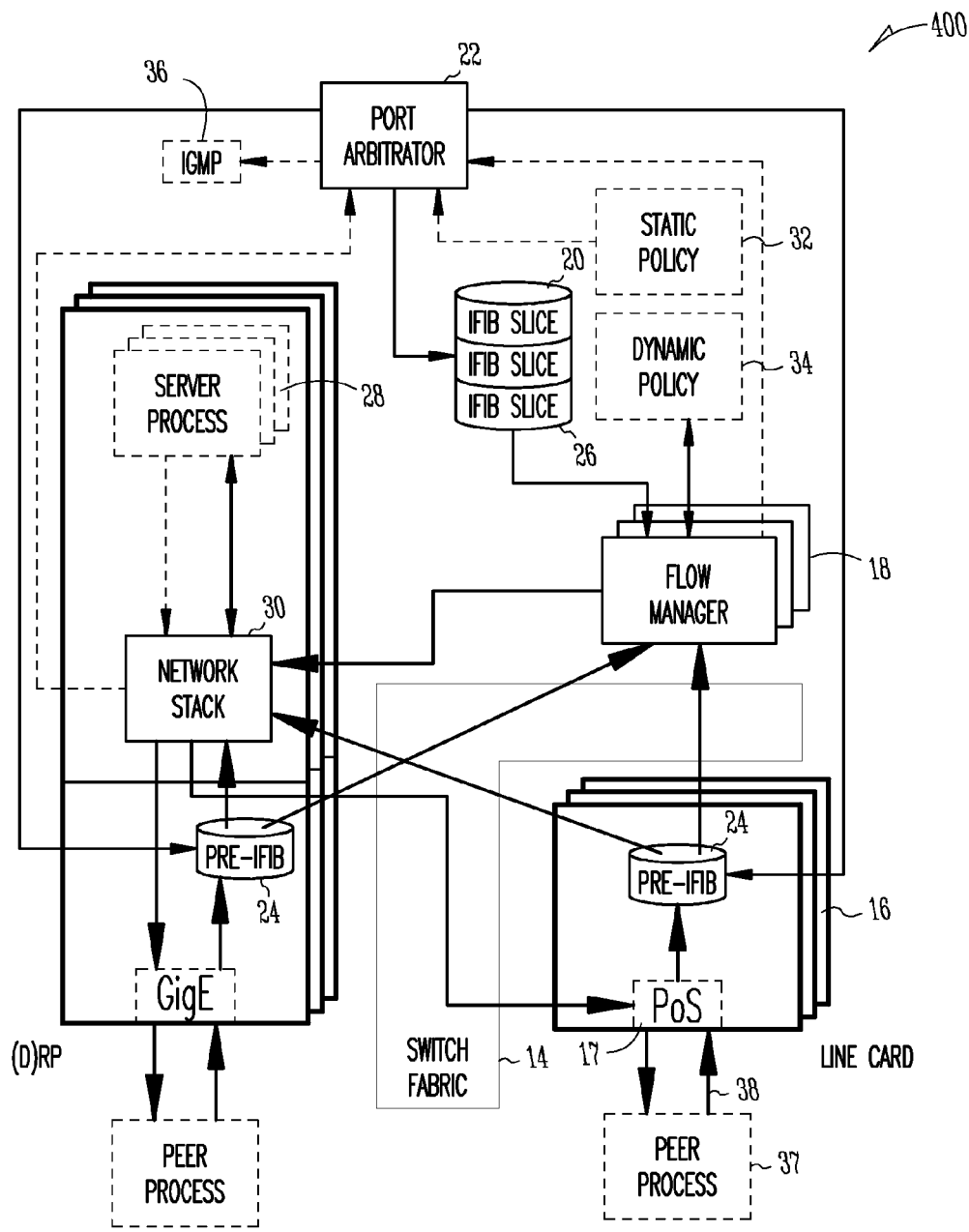
Figure 6:
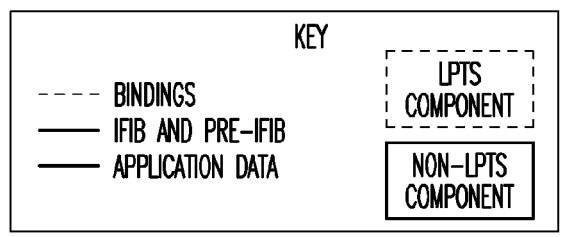

FIGS. 5 and 6 illustrate the overall structure of LPTS. Components with dotted outlines are other parts of router system that interact directly with LPTS, but are not part of it. A new data structure, IFIB 20, is used to direct inbound packets to a particular set of elements, once the packets have been identified as destined for the router itself. The IFIB performs the function of a Flow Routing Table.

As noted above, in the embodiment shown in FIG. 5, a Flow Manager 18 runs on one of the route processors 12. In such an embodiment, flow manager 18 receives locally addressed packets. If a packet matches a defined flow, it is forwarded to the element or elements that are interested in it; if not, it uses policy information to dynamically assign a new session to a particular element, or to reject it.

An abbreviated copy of the IFIB, Pre-IFIB 24, is present on each line card 16 and in the packet switching process on each RP 12. Pre-IFIB 24 is used to do initial triage on locally destined packets, directing them to the correct element, or to Flow Manager 18 for further processing.

As noted above, a port arbitrator 22 operates on one of the route processors 12. The Port Arbitrator constructs the IFIB 20 and the Pre-IFIBs 24, aggregating flow information that is supplied to it by the network stacks 30 on each RP 12, and static policy information that is supplied to it by applications. There is only one Port Arbitrator per Logical Router.

Network stack 30 assigns port numbers, and manages external data flows. Network stack 30 on each RP 12 has been modified such that operations assigning port numbers or setting up or tearing down external data flows are now reported to, or coordinated with the Port Arbitrator 22. In one embodiment, network stack 30 forwards the following information to the port arbitrator 22: TCP and UDP bind requests, wherein the bind request is a request to reserve a local port and IP address, or the bind request is a request to allocate a local port; TCP listen indications; outbound TCP connect indications, wherein the outbound TCP connect indications reserve a local port and at least one Internet Protocol (IP) address, or reserve a specific remote port and at least one IP address; socket close indications; raw IP and IS-IS interface selection requests; and multicast group join and leave operations.

As noted above, an abbreviated copy of the IFIB, Pre-IFIB 24, is present in the packet switching process on each RP 12. In one such embodiment, network stack 30 manages Pre-IFIB 24 in conjunction with flow manager 18. In another such embodiment, network stack 30 manages Pre-IFIB 24 in conjunction with port arbitrator 22.

FIG. 6 shows an embodiment on a router 400 having distributed flow managers 18. In one such embodiment, full copies of "slices" of IFIB 20 (split up for load-balancing purposes) are present in each of the Flow Managers 18. As in FIG. 5 above, an abbreviated copy of the IFIB, called the Pre-IFIB 24, is present on each line card 16 and in the packet switching process on each RP 12. Pre-IFIB 24 is used to do initial triage on locally destined packets, directing them to the correct element, or to a Flow Manager 18 for further processing.

As in FIG. 5 above, a port arbitrator 22 operates on one of the route processors 12. The Port Arbitrator constructs the IFIB 20 and the Pre-IFIBs 24, aggregating flow information that is supplied to it by the network stacks 30 on each RP 12, and static policy information that is supplied to it by application-specific policy modules. Again, there is only one Port Arbitrator per Logical Router.

Again, network stack 30 on each RP 12 has been modified such that operations assigning port numbers or setting up or tearing down external data flows are now reported to, or coordinated with the Port Arbitrator 22.

In one embodiment, port arbitrator 22 includes a list of listeners. Each listener represents an application that wants to receive some type of packet flow.

Port Arbitrator

There is one port arbitrator 22 per logical router. Port Arbitrator 22 controls distribution of the protocols supported by LPTS (Raw IP, TCP, UDP, IS-IS, and multicast group memberships). Port arbitrator 22 also performs port allocation. That is, when a network stack 30 within one of the elements (e.g., 16 or 12) needs a local TCP/IP port, it asks port arbitrator 22 to provide it.

The network stack (and other local processing entities) on each element forwards the following information to Port Arbitrator 22:

TCP and UDP bind requests (reserve a local port+IP address, or allocate a unique local port)
Raw IP socket bind requests
TCP listen indications
Outbound TCP connect indications (reserve local port+IP address, specific remote port+IP address)
Socket close indications
Raw IP and IS-IS interface selection requests
Multicast group join and leave operations Port Arbitrator 22 keeps track of the address tuples that are bound by each network stack 30 on routers 100, 200, 300, 400. In one embodiment, these tuples are:

Scope (entire Logical Router or just this element)
Network interfaces (can be 'any')
Layer 3 protocol (IPv4, IPv6, IS-IS)
Local Layer 3 addresses (can be 'any', and can be multicast addresses)
Layer 4 protocol (can be 'any' for IS-IS)
Local Layer 4 port (can be 'any' for Raw IP and IS-IS), or packet type (e.g., ICMP packet type or IPsec SPI value)
Remote Layer 3 addresses (can be 'any')
Remote Layer 4 port (can be 'any')

(In general, socket-based applications generate bindings that are Logical Router-wide in scope, while other applications (such as IPv6 Neighbor Discovery, or ICMP Echo Request processing) generate bindings that are local to a particular element).

In one embodiment, Port Arbitrator 22 allocates unique unused (ephemeral) TCP and UDP ports.

In one embodiment, Port Arbitrator 22 generates the Internal FIB (IFIB) 20 for the Flow Managers 20, and the Pre-IFIB 24 for each element, so that received TCP, UDP, Raw IP, and IS-IS packets that are addressed to the router itself can be forwarded to the correct, terminating element. Port Arbitrator 22 is the only entity on a logical router that generates IFIB and Pre-IFIB entries. In one such embodiment, port arbitrator 22 generates each IFIB entry based on a static router policy 32.

In one embodiment, port arbitrator 22 also arbitrates between route processors 12 trying to access conflicting areas or ports. For example, Telnet servers on two or more route processors 12 have to explicitly specify remote addresses in order not to overlap. If a first RP 12 requests to be Telnet server for a particular network and a second RP 12 requests to be Telnet server for the same network, the second request will be rejected. If, however, the second request is to a subset of the particular network, there is no problem. The more specific request will be encountered in the IFIB first.) Similarly, if two or more route processors attempt to listen exclusively on the same TCP or UDP port, the Port Arbitrator will allow only one of the requests to succeed.

As noted above, for each meaningful endpoint that is being listened on in a Logical Router, Port Arbitrator 22 maintains a list of listeners. The definition of a listener is protocol specific, and is defined in the corresponding documents.

In addition, Port Arbitrator 22 maintains a set of Fabric Group IDentifiers (FGIDs). The set of FGIDs include multicast addresses for the switch fabric, providing routing for the internal delivery of packets to multiple destinations. This is primarily for the delivery of multicast packets to multiple internal clients, but is also used to deliver packets to multiple route processors 12 that have identical bindings.

In one embodiment, Port Arbitrator 22 checkpoints its state, so that a new Port Arbitrator 22 can be started in the event that the active Port Arbitrator 22 fails. Since the Port Arbitrator does not participate in any active data flow, and does not examine or generate any data packets, existing connections are unaffected by a failure of the Port Arbitrator.

(Note that the data necessary to restart the Port Arbitrator may be recovered from the network stacks on each element in the system and from the Flow Managers, so checkpointing would be necessary only for the fastest possible recovery from failures. In one embodiment, Port Arbitrator 22 checkpoints the list of clients that are connected to it, so that if it is restarted, it can quickly determine when all of its previous clients have reconnected to it and replayed their bindings.)

In one embodiment, a Process Placement Daemon starts Port Arbitrator 22. In one embodiment, the RP 12 selected to run port arbitrator 22 is a function of its processing and memory requirements and not any affinity for any other process.

The IFIB and the Pre-IFIB

Because there can be multiple elements which can terminate some flows in routers 300 and 400, when a line card 16 receives a packet that is addressed to the router itself, it cannot simply forward it "to the RP."

Similarly, when an RP 12 receives a packet on its GigE interface that is addressed to the router itself, it cannot simply process it locally. Instead, a second FIB must be used to map protocols, addresses, and ports to a particular element. This is referred to as the Internal FIB (IFIB).

The IFIB specifies that when a received packet is destined for the router itself, further matches must be made on each of the fields specified under Port Arbitrator 22, above, plus a one-bit field indicating whether the packet is fragmented.

In one embodiment, each entry of the IFIB includes five values:

1) An opcode, which specifies what to do with the packet. The opcode can specify one of three values:
  Deliver. The packet is to be delivered to the element(s) specified in the element list.
  Drop. The packet is to be dropped silently.
  Reassemble. The packet is to be delivered to some RP 12, based on a hash of the layer 3 source and destination addresses.

2) An element list, specifying the elements to forward the packet to. In practice, the element list is a single switch fabric address, which may be the address of a single element, or an FGID, representing multiple elements. (In one embodiment, Port Arbitrator 22 manages its own set of FGIDs for this purpose.)

3) An internal forwarding priority, used to assign relative priorities for internal resources (such as switch fabric 14) used for inbound packets. A flow with a high internal forwarding priority is referred to as a critical flow.

4) A listener tag, which uniquely identifies the process to deliver the packet to on those elements. This either identifies the local IP or IS-IS stack, if this is the packet's ultimate destination, or a Flow Manager 18 process.

5) A local flag, which indicates that some entity on this element has interest in this packet (in element-local scope).

In the embodiment shown in FIG. 6, IFIB 20 is split into slices 26 for load-balancing purposes. In one embodiment, the initial definition of a slice is a Layer 4 protocol. Each slice 26 is distributed to a particular Flow Manager process. Should the processing burden on a particular Flow Manager process grow too large, slices 26 can be further subdivided. For TCP and UDP, this can be based on destination port or port range boundaries; for OSPF and IS-IS, this can be based on line card boundaries.

IFIB 20 is not distributed piecemeal to all elements in the system. Instead, a Pre-IFIB 24 is distributed synchronously to each element, and IFIB slices 26 are distributed synchronously to each Flow Manager process.

As noted above, Pre-IFIB 24 is a subset of IFIB 20. In one embodiment, Pre-IFIB 24 is generated by Port Arbitrator 22 and distributed to each line card 16 and to the packet switching process 28 running on each RP 12 (not shown).

In one embodiment, when PA 22 is asked to set up a binding, it blocks until the IFIB slice 26 is updated for that binding. PA 22 goes to the FM 18 for that service. The flow manager updates its tables and lets PA 22 know it is OK. PA 22 then updates the line cards 16, where data may be queued before applied to the pre-IFIB in a batch.

In one embodiment, the Pre-IFIBs in the TCAMs are updated synchronously.

Pre-IFIB 24 is used to do initial processing on a packet, once it has been identified as being local to the router. Pre-IFIB 24 contains information to distinguish packets in critical flows, which may be useful to line cards 16 during periods of receive-side congestion.

In one embodiment, Pre-IFIB 24 is consulted at two very specific times in inbound packet processing: 1) after a FIB lookup has indicated that the packet is destined for the router itself; and 2) when a line card is in Congestion Mode, Pre-IFIB 24 may be consulted prior to the FIB look-up, to determine if a packet belongs to a critical flow, or if it can be discarded. The congestion handling process is discussed below.

If the destination for a packet is trivial (e.g., there is only one process on the router listening for TELNET connections), then Pre-IFIB 24 directs the packet to the correct elements. Otherwise, the Pre-IFIB directs the packet to the proper Flow Manager process on an RP 12. Pre-IFIB 24 always contains default entries for TCP and UDP, directing unbound TCP and UDP packets to their respective Flow Managers 18.

In one embodiment, Pre-IFIB 24 is implemented within a ternary content addressable memory (ternary CAM or TCAM) on each element. A TCAM is a content addressable memory (CAM) with don't-care bits. A TCAM can be used to perform table look-ups based on multiple packet key fields at line speed. In this embodiment, it is also used to access each pre-IFIB 24 at line speed.

In another embodiment, Pre-IFIB 24 is implemented as a TCAM on line card 16 and in memory on RP 12. In such an embodiment, the size of Pre-IFIB 24 on line card 16 is strictly limited, so that it can be implemented in a small region of a TCAM.

The TCAM also places some important restrictions on the structure and interpretation of Pre-IFIB 24. In one such embodiment, Pre-IFIB 24 is limited to one entry is found per look-up. If there is more than one match, the first matching entry will be used. And, if the local flag is set in the Pre-IFIB payload, and the opcode specifies something other than Drop, then the packet must not be terminated by the local processing entity—it must be duplicated so that it can also be delivered to interested application(s) on Route Processors.

In one embodiment, each IFIB and Pre-IFIB is stored in a predefined order. In one such embodiment, IFIB entries are stored in order such that the most specific match hits first (i.e., entries go from specific to general). At the end are catch up cases used to handle packets that were not handled by higher priority entries.

In one embodiment, port arbitrator 22 folds less specific entries into more specific entries. For example, a flow for ICMP packets of a particular type may be combined with a flow for all ICMP packets, delivering the data to both elements.

In one embodiment, each update to the Pre-IFIB is just a single entry. In one such embodiment, each Pre-IFIB entry is distributed with a lookup priority, which specifies the order it is to be searched relative to other Pre-IFIB entries, and a storage priority, which indicates the relative priority of this entry for inclusion in the TCAM. The Pre-IFIB Manager inserts the entry into the Pre-IFIB as a function of both the lookup priority and the storage priority in order to place it in the correct place in the hierarchy.

In one embodiment, Pre-IFIB 24 is logically divided into two sections. The static section consists of default entries, which direct packets to the flow managers 18, as well as entries that are used to distinguish critical flows. (These entries have the highest storage priority.) The dynamic section consists of entries for individual flows.

In one embodiment, a Pre-IFIB Manager Process running on each Line Card 16 and on each RP 12 is responsible for maintaining its copy of Pre-IFIB 24. The Pre-IFIB Manager Process handles TCAM overflow, adding and deleting entries based on their storage priority. This process is also responsible for ignoring entries that do not apply (e.g., entries which specify interface filters for interfaces which do not exist on that element).

The update rate for the static section of the Pre-IFIB should be no greater than the frequency with which the system is reconfigured, either through explicit manual reconfiguration, or by implicitly through failure recovery or dynamic load re-balancing. These events should be relatively infrequent; coming in bursts of perhaps 100 entries every minute or two. Since the generation of entries in the dynamic section of the Pre-IFIB is optional (i.e., system integrity will not suffer if it is sub-optimally filled), the update rate for these entities can be tuned to a reasonable value to avoid overloading the TCAM, line card CPU-to-TCAM interface, or IPC bandwidth between an RP 12 and a line card 16. (Note that this means that a given Pre-IFIB 24 may be out-of-date with respect to the full IFIB 20. This is harmless.)

Note that in order to maintain the behavior of a unified router, all network interface addresses must be treated as router-wide IP Addresses. Thus, there is no distinction in the behavior of an element that "owns" an interface address and one that does not. Similarly, there is no explicit need to overlay an internal IP network on the switch fabric 14, in order to forward data internal to routers 100, 200, 300 or 400.

As noted above, it can be difficult to handle fragmented IP packets in routers having two or more route processors 12. Fragmented IP packets are an exception to the IFIB look-up procedure. Only the first packet in a plurality of associated IPv4 packet fragments includes a transport header. (It should be noted that a transport header might not be present in even the first fragment of an IPv6 packet.) Packets without transport headers cannot be used to retrieve routing information from an IFIB 20.

In one embodiment, fragmented IP packets are handled by a reassemble opcode in the Pre-IFIB payload. Fragments are sent to a specified RP 12 for reassembly. In one embodiment, the RP is chosen from among the set of active route processors by hashing on the source and destination IP addresses.

When the fragmented packet is complete, the RP 12 selected must then treat the packet as if it had just arrived on an external interface, i.e., do a Pre-IFIB look-up on it. Should the timeout expire before the complete packet arrives, the RP should generate an ICMP Time Exceeded message, specifying, "fragment reassembly time exceeded."

Note that switch fabric 14 has its own MTU, which is well below the maximum IP packet size. Thus if a reassembled packet exceeds that MTU, it would need to be re-fragmented to send it to the proper element. One simple way to avoid this would be to ensure that the IP reassembly logic maintains complete copies of the original fragments. When all fragments are present, they could be forwarded individually to the correct element. Each fragment would, by definition, fit within the switch fabric MTU. Note that these fragments must be specially tagged to avoid having the destination element perform another Pre-IFIB look-up on them. Note also that fragments that arrive on multiple interfaces, for any layer 4 protocol other than TCP or UDP, should be dropped.

As noted above, only a single Pre-IFIB entry is to be acted on per packet. However, situations can arise where it is impossible for a single Pre-IFIB entry to precisely specify which elements are to receive a given packet. Because of this, Pre-IFIB 24 may under-specify the matching criteria in a given entry, causing some unwanted packets to be forwarded to some elements.

Thus, in one embodiment, each element is prepared to filter and silently discard packets that it has no clients for. This means that the generation of TCP RST segments must be disabled on all elements, as must the generation of ICMP Port Unreachable and Protocol Unreachable messages. The Flow Managers 18 perform these functions centrally.

It should be noted that IFIB 20 and the access control list (ACL), if any, are independent entities. Though they may both use the same hardware, they perform independent functions and are managed separately. In one embodiment, ACL processing may be performed before or after a Pre-IFIB look-up; it makes no difference to the functioning of LPTS.

Memory requirements within routers 300 and 400 will be discussed next. In one embodiment, the full IRIB (the bindings as reported by the network stack on each element) is maintained in the memory space of the Port Arbitrator process. The full IFIB (an aggregation of the entries in the IRIB) is maintained in the memory space of the Port Arbitrator process. Slices of the full IFIB are maintained in the memory spaces of each Flow Manager process. (These entries also need to include statistical information, so they will be slightly larger than the entries kept in Port Arbitrator 22. In aggregate, this is the same number of entries as in the full IFIB, but each slice may be on a different RP 12.

For performance reasons, in one embodiment, these IFIB slices are duplicated in the packet switching process' address space on the RP 12 on which each Flow Manager 18 is running. A software copy of Pre-IFIB 24 is also maintained in a process on each element line card 16 and RP 12, both for use in programming or reprogramming the TCAMs, and for the software-switching path.

In order to recover from FGID database process restarts, in one embodiment Port Arbitrator 22 maintains a list of the FGIDs it allocates, as well as the list of the members it adds to each FGID.

IFIB Generation Procedure

The Port Arbitrator uses a simple algorithm to translate sets of bindings into IFIB entries:

Identical bindings are combined into flows. If the bindings are from different route processors, an FGID is allocated to allow delivery to all interested listeners.

Superset/subset relationships are identified. A subset flow matches a subset of packets that also match a superset flow. The list of route processors from the superset flows are added to the lists of route processors from the subset flows, so that packets are delivered to all.

Conflicting flows are avoided by ignoring certain key fields or bindings. Two flows are in conflict if they both match the same packet, using a different wild-card match. For example, a flow which wants all ICMP packets of type t, regardless of interface, and a flow which wants all IGMP packets from interface x, would both match an IGMP packet of type t which arrives on interface x. One solution to this problem is to generate a third flow that matches both type t and interface x, sending the packets to both flows' route processors. In one embodiment, however, the solution employed is much simpler. In each case where a conflict is possible because of the flexibility of the key specifications, one or more of the keys is ignored in those bindings.

Multicast source filters imply an additional flow. An include-mode filter (specifying which source addresses the router will accept packets from) implies an additional flow with a wild-card source address and a drop opcode. An exclude-mode filter (specifying which source addresses the router will not accept traffic from) implies an additional flow with a wild-card source address, delivering packets to the flows' route processors 12.

The Flow Managers

When flow definitions are too complex to fit in the Pre-IFIB, or when there is not yet a defined flow for a packet, the packet is forwarded to a Flow Manager 18. In the system shown in FIG. 6, each Flow Manager process is responsible for forwarding packets associated with a slice of the IFIB 20.

The packets are dispatched in one of three ways:

If there is an existing flow for the packet, it is forwarded to the correct elements.

If there is no existing flow for the packet, but a dynamic distribution policy has been defined for the destination port in the packet, then the associated policy module is consulted to select an element to handle the connection. The packet is forwarded to that element, and the IFIB is updated to reflect the new session. (This applies only to UDP packets and TCP SYN packets.)

If neither of the above cases is true, then an appropriate error response will be generated (e.g., TCP RST or ICMP UDP Port Unreachable), and the packet will be dropped. Note that this means that the TCP and UDP Flow Managers 18 are responsible for the generation of TCP RST segments and ICMP Port Unreachable messages for an entire Logical Router.

In one embodiment, the Process Placement Daemon starts Flow Managers 18. In one embodiment, the RP selected to run each flow manager 18 is based on its processing and memory requirements, not on any affinity for any other process. For performance reasons, in one embodiment the switching logic in the Flow Managers (IFIB look-up) is implemented as a dynamic-link library in the packet switching process.

In one embodiment, flow managers 18 keep statistical information for the IFIB entries that they use. They periodically identify high-volume flows and submit these to Port Arbitrator 22 for inclusion in the dynamic portion of the Line Card Pre-IFIBs 24.

In one embodiment, port arbitrator 22 also maintains and aggregates a Multicast Group Membership List for each logical router. This list consists of the IFIB entries that specify multicast local layer 3 addresses; the remote layer 3 addresses, if specified, are the filters. In such an embodiment, port arbitrator 22 aggregates this list (removing the element ID, layer 3 protocol, local port, and remote port information) and distributes it to line cards 16 and route processors 12. The purpose of this list is to enable or disable multicast reception. Note that the Multicast Group Membership List is different for each line card 16, as it applies only to the interfaces for that card.

The Port Arbitrator also distributes the Multicast Group Membership List to the IGMP protocol process 36, which uses it to generate local entries in the MRIB. Note also that the Multicast Group Membership List is distinct from the MRIB, which is generated and distributed independently.

Port Arbitrator Network Stack Interface

A series of IPC calls is defined for communication between the element network stacks and Port Arbitrator 22:

pa_bind( ) establishes a binding of a particular data flow to an element. The parameters are protocol specific and are covered in the corresponding protocol documents.

pa_unbind( ) removes a binding requested by pa_bind( )

ns_refresh( ) is a request that the Port Arbitrator makes of each of the element network stacks 30. It is used when the Port Arbitrator restarts, to request flow information from each. This information is then provided in the form of ordinary pa_bind( ) requests, terminated by a pa_refresh_done( ) call, below.

pa_refresh_done( ) is an indication that an element network stack has finished dumping its list of flows to the Port Arbitrator in response to an ns_refresh( ) call. Note that in order to preserve the consistency of LPTS, it is invalid for an element network stack 30 to report a flow that it did not already successfully hold, before it makes the pa_refresh_done( ) call. However, since there is no way to enforce this rule, an element network stack 30 must be prepared for a "refresh" pa_bind( ) call to fail, even though it previously succeeded, and to take the appropriate action (marking the socket as unusable, causing subsequent I/O errors, etc.).

There may be multiple entities on a given element that use the Port Arbitrator Network Stack Interface, e.g., one connection for socket-based applications, which creates bindings with LR-wide scope, and another connection for local applications, which creates bindings with element-local scope. The organization of these entities is implementation-specific.

Port Arbitrator Client Interface

Port Arbitrator 22 provides an explicit interface to clients. It is indented for debugging and monitoring, and for low-volume run-time use, such as when a new BGP connection arrives (on the order of 7500 queries per second).

The Port Arbitrator can be queried to learn if a given flow exists. It returns the IDs of the elements that are bound to it. The Port Arbitrator can also be queried for all flows that match a given wild-card pattern, such as all UDP flows, or all TCP flows from a given peer address.

Distribution Policy Interface

If there is more than one listener per logical router for a given well known TCP or UDP port, then it is necessary to decide where each inbound connection will be handled. The Distribution Policy interface is used by application-specific logic to guide a Flow Manager 18 in these decisions. The distribution policy interface uses connections between policy modules and Port Arbitrator 22, one per TCP or UDP well known port.

In one embodiment, PA 22 has tables for a variety of services. PA 22 populates these tables based on configuration information and on the dynamic state of the router.

Distribution Policy comes in two flavors: static 32 and dynamic 34. Static policy 32 is used when the assignment of connections to elements is made at configuration time, or is controlled by slowly changing criteria. Static policy is implemented by allowing a binding that represents a TCP or UDP listening socket to have an additional parameter: the remote address (or remote address prefix) to receive new connection requests from. This information is provided by the application, using an extension to the standard Sockets API.

Dynamic policy 34 is used when a distribution decision needs to be made as each connection arrives. In one embodiment, this interface is controlled by one call and one callback:

dp_init( ) is used to initialize the connection and specify the protocol (TCP or UDP) and local port that this policy will control.

When a new connection arrives, the Flow Manager sends a dp dispatch message to the associated dynamic policy module. The module responds with a message that indicates which element should handle the connection, or that the connection should be rejected.

In one embodiment, when port arbitrator 22 detects that a dynamic policy module has disconnected, it will reject all new connections for the associated port, until the dynamic policy module reconnects.

Fabric Interface

Because of the difficulty of passing anything but unicast TCP and UDP traffic, LPTS does not treat the switch fabric 14 as an IP network. Instead, it treats it as a proprietary communications channel.

To do this, in one embodiment, when a packet is forwarded by LPTS across the switch fabric 14, the fabric header includes a field indicating the disposition of the packet. In one such embodiment, this field is an enumeration with the following values:

Punt. The packet is to be treated as if it had just arrived from an external interface. It may be looked up in the FIB or MFIB, and Pre-IFIB 24. It may be delivered to local applications, transmitted on local interfaces, and forwarded to other elements.

Transmit. The packet is to be forwarded to an external interface or interfaces only. It must not be delivered to local applications or forwarded to other elements.

Consume. The packet is to be consumed by the local network stack, or dropped. It must not be looked up in IFIB 20 or Pre-IFIB 24, and must not be forwarded to other elements.

Flow Manager t. The packet is to be delivered to Flow Manager t, where t is a tag used to distinguish Flow Manager processes on a given RP 12. Additional enumeration types may be defined for use by other parts of the system.

Dynamic Behavior

LPTS recovery after a client process failure—There is no explicit recovery mechanism in LPTS to handle client process failure. The normal protocol-specific recovery procedures still apply, with the sockets held by the processing being closed. This may result in one or more pa_unbind( ) calls being made by the element network stack to Port Arbitrator 22 to remove the associated flows, which in turn may cause Port Arbitrator 22 to update IFIB 20.

LPTS recovery after an RP failure—There is no special LPTS recovery from RP failures. The applications on the RP are restarted (or are started on a backup RP); they re-establish their bindings and those bindings are conveyed by the transports to Port Arbitrator 22.

LPTS recovery after a Port Arbitrator failure—Should the Port Arbitrator fail (either due to a failure of the Port Arbitrator itself, or due to a failure of the RP on which the Port Arbitrator is running), a new Port Arbitrator will be started. The transports will connect to the new Port Arbitrator 22.

Once a pa_refresh_done( ) has been received from each element (or a reasonable timeout has expired), the Port Arbitrator will construct a new IFIB 20.

At the same time, the Flow Managers 18 will connect to the new Port Arbitrator 22, implicitly requesting a full download of their IFIB slices 26. They will mark all of their existing IFIB entries as "stale", but continue using them. When a duplicate entry is received from Port Arbitrator 22, the original entry's "stale" flag is cleared.

When the new Port Arbitrator indicates that all entries have been transferred, the Flow Managers 18 will purge any IFIB entries that are still marked as "stale."

In one embodiment, Flow Managers 18 also supply Port Arbitrator 22 with information regarding the highest-volume flows, so that the Port Arbitrator can reconstruct the dynamic Pre-IFIB entries for line cards 16. Line cards 16 also reconnect to the new Port Arbitrator, and request full Pre-IFIB 24 downloads. They will use the same mark-and-sweep technique as the Flow Managers 18 to synchronize their databases.

In one embodiment, Port Arbitrator 22 supplies the static portion of the Pre-IFIB 24 immediately. The dynamic entries may not be available at the time that the line card reconnects, so sub-optimal routing through the Flow Managers 18 may occur for a brief period of time.

LPTS Recovery after a Flow Manager failure—Should a Flow Manager 18 process fail, some data flows may be interrupted until it recovers. This is because the Flow Manager 18 is responsible for directing data packets for low-volume flows that are not recorded in Pre-IFIB 24.

No special action is taken by LPTS until the Flow Manager process is restarted. At that time, the new Flow Manager connects to Port Arbitrator 22, and requests a full copy of its IFIB 20 or its IFIB slice 26. Dynamic policy modules 34 connect to the new Flow Manager 18. The Port Arbitrator 22 then refreshes the Flow Manager's copy of the IFIB 20 or IFIB slice 26 that it controls.

As soon as it restarts, the new Flow Manager 18 begins accepting inbound packets. However, until it receives an indication from the Port Arbitrator 22 that the full IFIB slice 26 has been completely received, it will not reject any packets. That is, it will not generate any ICMP Unreachable or TCP RST messages). Instead, it will drop those packets silently.

LPTS Recovery after a Line Card failure—LPTS will take no special action in response to a line card failure, until the line card 16 restarts. When the line card restarts, it will request a Pre-IFIB refresh from the Port Arbitrator. The Port Arbitrator 22 then supplies a full copy of the line card's Pre-IFIB 24.

Packet Processing

Figure 7:
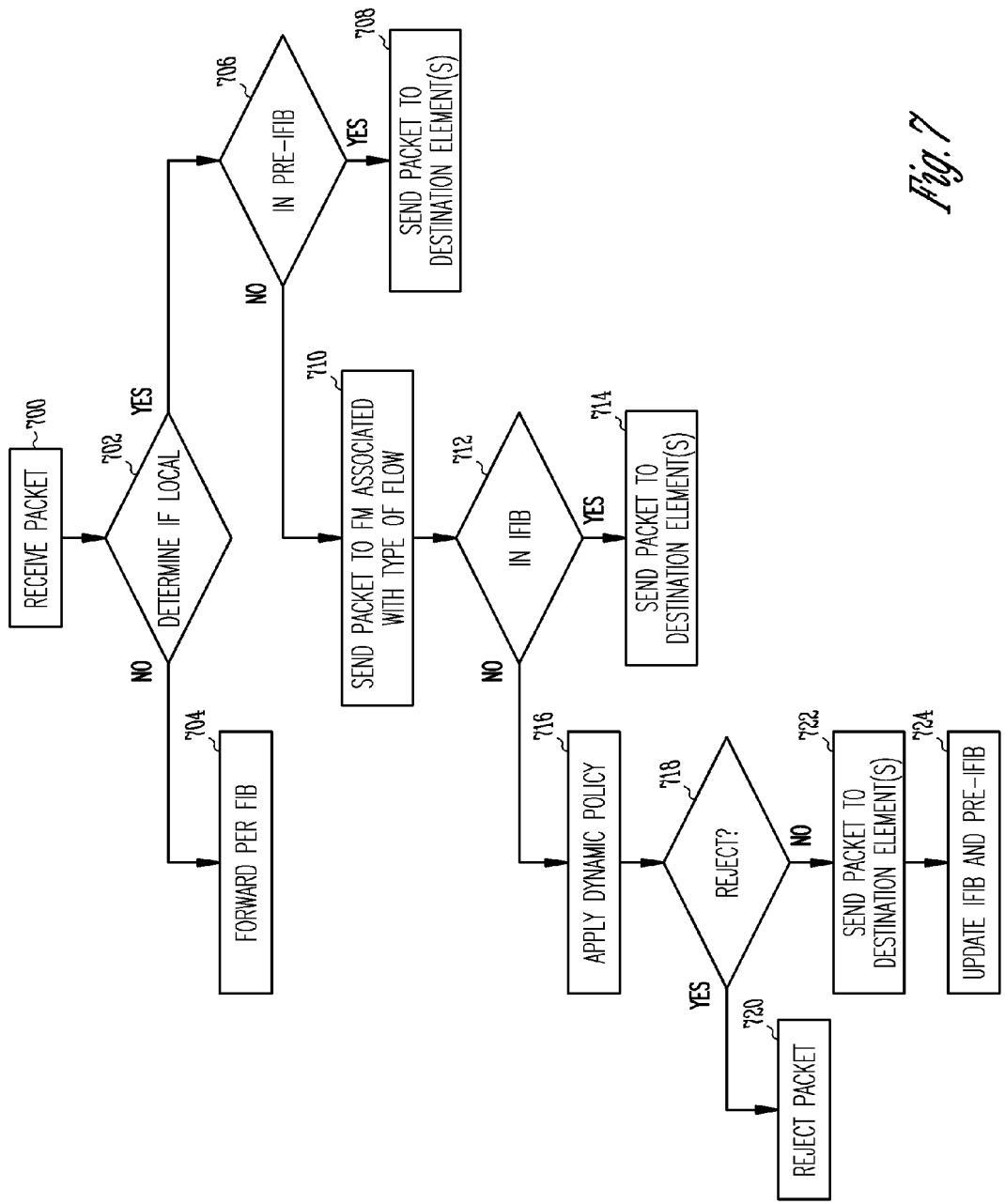
FIG. 7 is a flowchart of a computerized method for handling a packet received by a router according to an embodiment of the invention.

Packet processing of packets within routers 300 and 400 will be discussed in the context of FIG. 7. In the flowchart of FIG. 7, at 700 a packet is received at an element of router 300 or 400. The element may be a line card 16, it may be a route processor 12, or it may be some other element capable of receiving a packet and routing it through switch fabric 14. The element determines, at 702, whether the packet is a locally addressed packet. If not, the packet is forwarded outside the router as a function of the forwarding Information Base (FIB). If, however, the packet is a locally addressed packet, the element consults its Pre-IFIB 24 at 706.

If the packet matches an entry in Pre-IFIB 24 having one or more destination elements, the packet is forwarded to the destination element(s) at 708. If not, the packet is forwarded, at 710, to route processor 12 having the flow manager 18 associated with the packet.

The route processor 12 having the flow manager 18 associated with the packet receives the packet and, at 712, consults its IFIB 20 (or IFIB slice 26). If the packet matches an entry in IFIB 20 (or IFIB slice 26), control moves to 714 and the packet is forwarded to the destination element(s) listed in the IFIB entry.

If, however, the packet does not match an entry in IFIB 20 (or IFIB slice 26), control moves to 714 and a request is made to the associated dynamic policy module to apply the dynamic policy to the packet. If there is no dynamic policy for this packet type, or if the dynamic policy indicates that the connection should be rejected, Flow Manager f generates an error response (e.g., TCP RST or ICMP UDP Port Unreachable) and the process is complete.

If the dynamic policy indicates that the connection should be accepted, control moves to 722 and the packet is sent to the destination element(s) determined by the dynamic policy. Control then moves to 724 and an IFIB entry is created and stored to IFIB 20 and Pre-IFIB 24.

Examples of packet processing will be reviewed next. This is not intended to be a complete set of packet processing scenarios but rather a representative sampling of processing for different types of packets. First, packet processing when a new connection packet arrives at element r is described.

When a new connection packet arrives at element r, element r looks up the packet in the FIB and determines that it is local. Element r looks up packet in the Pre-IFIB 24; the Pre-IFIB entry corresponding to the packet points to Flow Manager t on element f. Element r forwards the packet to element f, over the switch fabric 14 with a fabric header of type Flow Manager (t).

Element f decodes the fabric header, using the tag to identify Flow Manager t. Flow Manager t looks up the packet in the full IFIB slice 26 it controls. If there is a match, IFIB slice 26 yields a fabric address e. Otherwise, Flow Manager t applies the dynamic policy to determine the element e to process the connection.

Flow manager t forwards packet to element e, over the fabric 14. Fabric header is of type Consume. Element e decodes fabric header and sees type Consume. Element e bypasses FIB/Pre-IFIB look-ups and processes the packet locally, delivering the packet to an application.

As noted above, if there is no dynamic policy for this packet type, or if the dynamic policy indicates that the connection should be rejected, Flow Manager f generates an error response (e.g., TCP RST or ICMP UDP Port Unreachable).

A similar process occurs when a packet in a low-volume flow arrives at element r. That is, when the Pre-IFIB associated with element r does not contain an entry that is a complete match to the low-volume flow.

When an existing high-volume connection packet arrives at element r, element r looks up packet in the FIB and determines that it is local. Element r then looks up packet in the Pre-IFIB associated with element r. If there is an exact match in Pre-IFIB 24, the Pre-IFIB entry points to element e and has a type Consume. Element r then forwards packet to element e, over the fabric 14 with a fabric header of type Consume. Element e decodes fabric header and sees type Consume. Element e bypasses FIB/Pre-IFIB look-ups and processes the packet locally, delivering the packet to an application.

Multicast packet processing will be described next. A multicast packet arrives on receiving element r. If element r looks up the packet in the Multicast Forwarding Information Base (MFIB) and finds the local copy flag set for the ingress interface, element r then looks up the packet in the Pre-IFIB associated with element r. The Pre-IFIB entry points to element list/(an FGID) and type Consume. Element r forwards packet to element list l, over the fabric. Fabric header includes a tag indicating local consumption. For each element e in element list l:

Element e decodes fabric header, sees type Consume.
Element e bypasses MFIB/Pre-IFIB look-ups and processes packet locally.
Element e delivers packet to application.

If element r looks up the packet in the MFIB and finds an element list l (an MFIB FGID), element r forwards the packet to element list l. For each egress element e in element list l, element e looks up the packet in the MFIB. If the MFIB entry has the local copy bit set for this interface, element e looks up packet in the Pre-IFIB associated with element e. If the Pre-IFIB entry points to element list l2 (an LPTS FGID) and type Consume, element e forwards packet to element list l2, over the fabric with type Consume. For each element e2 in element list l2:

Element e2 decodes fabric header, sees type Consume.
Element e2 bypasses MFIB/Pre-IFIB look-ups and processes packet locally.
Element e2 delivers the packet to an application.

If element r looks up the packet in the MFIB and finds the local copy flag set for the ingress interface, element r then looks up the packet in the Pre-IFIB associated with element r. If the Pre-IFIB entry points to Flow Manager t on element f, element r forwards the packet to element f, over the fabric 14 with a fabric header including type Flow Manager(t). Element f decodes fabric header, using the tag to identify Flow Manager t. Flow Manager t looks up the packet in the full IFIB slice 26 that it controls.

If there is no match, the packet is dropped. If there is a match, the IFIB slice 26 yields an element list l (an FGID). Flow manager t then forwards packet to element list l, over the fabric 14 with a fabric header including type Consume.

For each element e in element list l:
Element e decodes fabric header, sees type Consume.
Element e bypasses MFIB/Pre-IFIB look-ups and processes packet locally.
Element e delivers packet to application.

Handling of an unfragmented ICMP Echo Request Packet will be discussed next. In the case of an unfragmented ICMP Echo Request Packet, a packet arrives on receiving element r. Element r looks up the packet in the FIB and determines that it is local. Element r then looks up the packet in the Pre-IFIB 24 and finds that the packet has both local interest (the local flag is set) and is wanted by an application (the opcode is Deliver). Element r responds to the ICMP Echo Request Packet. (The implementation of local applications is element-specific.) Element r delivers the packet to the fabric address specified in the Pre-IFIB entry.

Handling of an unfragmented ICMP Packet with embedded header will be discussed next. In the case of an unfragmented ICMP Packet with embedded header, a packet arrives on receiving element r. Element r looks up the packet in the FIB and determines that it is local. Element r then detects that this is an unfragmented ICMP Packet that includes an embedded IP header. Element r uses the L4 protocol type and reversed source and destination address and port fields from the embedded header to do the Pre-IFIB look-up, rather than those fields from the IP header. Processing proceeds as normal.

Handling of a packet fragment will be discussed next. A packet arrives on receiving element r. Element r looks up packet in the FIB and determines that it is local. Element r detects that this is a fragment. Element r hashes the source and destination addresses to yield the fabric address of a route processor f Element r forwards the packet to element f, with type Consume. Element f receives the packet, skips the FIB/Pre-IFIB look-ups and places it in a reassembly buffer.

If the packet is now complete, element f processes it as if it had just arrived from the outside (type Forward).

Handling of a non-critical packet on a congested receiving element will be discussed next. In one embodiment, non-critical packets on a congested receiving element are dropped. A packet arrives on congested receiving element r. Element r looks up the packet in the Pre-IFIB associated with element r.

If the Pre-IFIB indicates that the packet is not in a critical flow, the packet is dropped. Element r looks up the packet in the FIB. If the packet is not local, it is dropped. Processing proceeds as normal.

In some embodiments, the methods described above are implemented as a computer data signal embodied in a carrier wave, that represents a sequence of instructions which, when executed by a processor, such as processor 118 in FIG. 1, cause the processor to perform the respective method. In other embodiments, the methods are implemented as a computer-accessible medium having executable instructions capable of directing a processor, such as route processor 12 in FIGS. 1-6, to perform the respective method. In varying embodiments, the medium is a magnetic medium, an electronic medium, or an optical medium.

CONCLUSION

Apparatus, system and methods that support forwarding of locally addressed packets in routers have been described. Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the present invention. For example, although described in object-oriented terms, one of ordinary skill in the art will appreciate that the invention can be implemented in a procedural design environment or any other design environment that provides the required relationships.

In particular, one of skill in the art will readily appreciate that the names of the methods and apparatus are not intended to limit embodiments of the invention. Furthermore, additional methods and apparatus can be added to the components, functions can be rearranged among the components, and new components to correspond to future enhancements and physical devices used in embodiments of the invention can be introduced without departing from the scope of embodiments of the invention. One of skill in the art will readily recognize that embodiments of the invention are applicable to future communication devices, different file systems, and new data types.

It is intended that this invention be limited only by the following claims and equivalents thereof.

What is claimed is:
1. A method, comprising:
at a port arbitrator in a route processor that includes an Internal Forwarding Information Base (IFIB), constructing IFIB entries by translating sets of bindings into the IFIB entries, wherein the translating comprises:
combining identical bindings into flows;
identifying superset/subset relationships and adding a list of route processors from superset flows to a list of route processors from a subset flow;
reviewing the flows to prevent conflicting flows; and
generating a third flow on the basis of the reviewing.

2. The method according to claim 1, wherein the combining of identical bindings into flows includes allocating a fabric group identifier if the bindings are from different route processors.

3. The method according to claim 1, wherein the reviewing of the flows includes determining if two flows match the same packet using a different wild-card match.

4. The method according to claim 1, wherein the reviewing of the flows includes determining if two flows match the same packet using a different wild-card match; and
the generating comprises, if two flows match the same packet using a different wild-card match, generating the third flow to send the packet to route processors associated with the two flows.

5. A router, comprising:
a plurality of route processors, wherein one or more route processors include an Internal Forwarding Information Base (IFIB); and
wherein at least one of the route processors comprises a port arbitrator, the port arbitrator configured to:
translate sets of bindings into IFIB entries by:
combining identical bindings into flows;
identifying superset/subset relationships and adding a list of route processors from superset flows to a list of route processors from a subset flow; and
reviewing the flows to prevent conflicting flows.

6. The router of claim 5, wherein the port arbitrator combines identical bindings into flows by allocating a fabric group identifier if the bindings are from different route processors.

7. The router of claim 5, wherein the port arbitrator reviews the flows by:
determining if two flows match the same packet using a different wild-card match; and
generating a third flow to send the packet to route processors associated with the two flows if two flows match the same packet using a different wild-card match.

8. A non-transitory computer-accessible medium having executable instructions to manage a router that includes a plurality of route processors and a port arbitrator, wherein one or more route processors include an Internal Forwarding Information Base (IFIB), the executable instructions capable of causing the port arbitrator to:
construct IFIB entries by translating sets of bindings into the IFIB entries, by:
combining identical bindings into flows;
identifying superset/subset relationships and adding a list of route processors from superset flows to a list of route processors from a subset flow; and
reviewing the flows to prevent conflicting flows.

9. The non-transitory computer-accessible medium of claim 8, wherein the executable instructions cause the port arbitrator to combine identical bindings into flows by allocating a fabric group identifier if the bindings are from different route processors.

10. The non-transitory computer-accessible medium of claim 8, wherein the executable instructions cause the port arbitrator to review the flows by determining if two flows match the same packet using a different wild-card match.

11. The non-transitory computer-accessible medium of claim 8, wherein the executable instructions cause the port arbitrator to review the flows by determining if two flows match the same packet using a different wild-card match, and if the two flows match the same packet using a different wild-card match, generate a third flow to send the packet to route processors associated with the two flows.

* * * * *